United States Patent [19]
Izumitani et al.

[11] 4,120,814
[45] Oct. 17, 1978

[54] FLUOROPHOSPHATE-BASE LASER GLASSES

[75] Inventors: Tetsuro Izumitani, Hino; Michitaka Tsutome, Akishima, both of Japan

[73] Assignee: Hoya Corporation, Tokyo, Japan

[21] Appl. No.: 819,440

[22] Filed: Jul. 27, 1977

[30] Foreign Application Priority Data

Feb. 28, 1977 [JP] Japan ............................. 52/21081

[51] Int. Cl.$^2$ ................. C03C 3/16; C09K 11/08
[52] U.S. Cl. .................... 252/301.4 P; 106/47 Q; 106/47 R; 331/94.5 E
[58] Field of Search ............ 106/47 Q, 47 R; 252/301.4 P; 331/94.5 E

[56] References Cited

U.S. PATENT DOCUMENTS

| 3,549,554 | 12/1970 | Hirayama et al. | 252/301.4 P |
| 3,615,764 | 10/1971 | Krolla | 106/47 Q |
| 3,656,976 | 4/1972 | Izumitani | 106/47 Q |
| 3,743,492 | 7/1973 | Ogita | 106/47 Q |
| 3,846,142 | 11/1974 | Buzhinsky et al. | 252/301.4 P |

FOREIGN PATENT DOCUMENTS

| 2,304,582 | 10/1976 | France | 106/47 Q |
| 606,509 | 8/1948 | United Kingdom | 106/47 Q |
| 909,679 | 10/1962 | United Kingdom | 106/47 Q |
| 1,405,717 | 9/1975 | United Kingdom | 106/47 Q |
| 1,406,134 | 9/1975 | United Kingdom | 106/47 Q |
| 447,379 | 8/1975 | U.S.S.R. | 106/47 Q |

OTHER PUBLICATIONS

Pouwain, M. et al., "Verres Fluores au Tetraflorures de Zirconium Proprietes Optiques d'un Verre Dope au Nd$^{3+}$" Mat. Res. Bull., 10 (4) ,1975, pp. 243–246.
Galant V. E., et al., "Optical Media—Methods of Producing Fluorphosphate Flints"—Sov., J. Opt. Tech., 41, (11), Nov. 1974, pp. 524–526.

Primary Examiner—Helen M. McCarthy
Attorney, Agent, or Firm—Sughrue, Rothwell, Mion, Zinn and Macpeak

[57] ABSTRACT

A fluorophosphate-base laser glass having a low non-linear refractive index coefficient and a low liquid phase temperature and comprising a glass composed of 5 to 25% $\frac{1}{2}P_2O_5$ and the remainder of metal fluorides and 0.01 to 3% $\frac{1}{2}Nd_2O_3$ being incorporated into the glass, and more particularly a fluorophosphate-base laser glass comprising 5 to 25% $\frac{1}{2}P_2O_5$, 20 to 35% $AlF_3$, 0 to 5% $YF_3$, 22 to 55% $BaF_2+SrF_2+CaF_2+MgF_2$, 0 to 25% $NaF+LiF+KF$ and 0.01 to 3% $\frac{1}{2}Nd_2O_3$, all % being cationic %.

9 Claims, No Drawings

FLUOROPHOSPHATE-BASE LASER GLASSES

BACKGROUND OF THE INVENTION

1. Field of the Invention

The present invention relates to a fluorophosphate-base laser glass, and more particularly, it relates to an extremely stable fluorophosphate-base laser glass possessing a very low non-linear refractive index coefficient.

2. Description of the Prior Art

Heretofore, a silicate-base laser glass and a phosphate-base laser glass are known as laser glasses. Japanese patent application (OPI) No. 111,916/74 (corresponding to U.S. patent application Ser. No. 446,085 filed Feb. 26, 1974, now abandoned) discloses a silicate-base glass composed of an $SiO_2$-$Al_2O_3$-$SrO$-$Li_2O$-$Na_2O$ system as a laser glass suitable for high speed and repeating oscillation. Further, Japanese patent application No. 613,795/74 discloses a phosphate-base laser glass composed of a $P_2O_5$-$La_2O_3$-$Al_2O_3$-$RO$ system as a laser glass having far higher gain as compared with the conventional silicate-base glass.

Laser glasses for nuclear fusion have recently been required to have a high grain and also a low non-linear refractive index coefficient $n_2$ (the refractive index coefficient proportional to the square of the intensity of the electric field applied to the laser). Japanese patent application No. 32,696/75, corresponding to U.S. patent application Ser. No. 667,756 filed Mar. 17, 1976, discloses a $P_2O_5$-$Al_2O_3$-$La_2O_3$-$Y_2O_3$-$Na_2O$-$Li_2O$ series laser glass as a laser glass possessing a low non-linear refractive index coefficient and a high output.

However, the above-described phosphate glass still does not have a satisfactory non-linear refractive index coefficient $n_2$ and laser glass must have a lower $n_2$.

The refractive index $n$ of a laser in a high electric field is shown by the equation $$n = n_0 + n_2 E^2$$

wherein $n_2$ is the non-linear refractive index coefficient, E is the intensity of the applied electric field and $n_0$ is the refractive index coefficient in a non-laser light (non-electric) field. If the non-linear refractive index coefficient is high, the refractive index becomes higher when the laser light passes through the glass whereby self-focusing of the laser glass occurs breaking the laser glass, and, as a result, it is difficult to exhibit high output sufficiently.

As a result of extensive investigations in order to obtain a laser glass possessing a lower non-linear refractive index coefficient $n_2$ than that of the conventional phosphate laser glass and which is stable as a glass itself, it has now been found that in order to obtain such a glass, it is necessary to reduce the phosphate content in the glass to as low as possible and the reduction of the phosphate content can be made by substituting the glass modifiers with fluorides, and the present invention has been achieved.

SUMMARY OF THE INVENTION

An object of the present invention is to provide a stable fluorophosphate-base laser glass having a lower non-linear refractive index coefficient.

Another object of the present invention is to provide a fluorophosphate-base laser glass comprising a glass comprising 5 to 25% $\frac{1}{2}P_2O_5$ and the remainder of metal fluorides and 0.01 to 3% $\frac{1}{2}Nd_2O_3$, all % being cationic %.

DETAILED DESCRIPTION OF THE INVENTION

Representative examples of the metal fluorides which can be used in the present invention include those of Al, Y, Ba, Sr, Ca, Mg, Na, K, Li and La. Specific examples of metal fluorides which can be used in the present invention include $AlF_3$, $YF_3$, $BaF_2$, $SrF_2$, $CaF_2$, $MgF_2$, $NaF$, $KF$, $LiF$ and $LaF_3$.

A laser glass containing 5 to 25 cationic % $\frac{1}{2}P_2O_5$ has a sufficiently low non-linear refractive index coefficient $n_2$ and is a desirable glass as a laser glass for nuclear fusion from a performance standpoint. However, since the glass forming oxide ($P_2O_5$) content is very small, the stability as a glass is poor. In general, laser glasses for nuclear fusion must be a large-sized mass of glass. In veiw of this, there is further provided a fluorophosphate-base laser glass comprising 5 to 25% $\frac{1}{2}P_2O_5$, 20 to 35% $AlF_3$, 0 to 5% $YF_3$, 22 to 55% $BaF_2+SrF_2+CaF_2+MgF_2$, 0 to 25% $NaF+KF+LiF$ and 0.01 to 3% $\frac{1}{2}Nd_2O_3$, all % being cationic %.

Each component of the laser glass of the present invention and the amount thereof are described in detail below.

If the amount of $\frac{1}{2}P_2O_5$ is lower than 5 cationic %, glassification does not occur, while if the amount of $\frac{1}{2}P_2O_5$ is higher than 25 cationic %, the non-linear refractive index coefficient $n_2$ increases.

The amount of $AlF_3$ preferably ranges from 20 to 35 cationic % in order to decrease the liquid phase temperature.

$YF_3$ is an effective component to stabilize the glass, and if the amount of $YF_3$ exceeds 5 cationic %, the effect disappears. A preferred amount of $YF_3$ is 0.1 to 4 cationic %.

The total amount of $BaF_2$, $SrF_2$, $CaF_2$ and $MgF_2$ is preferably 22 to 55 cationic % in order to also obtain a sufficiently stable glass.

Each of $NaF$, $KF$ and $LiF$ is an effective component to stabilize the glass and to reduce the non-linear refractive index coefficient $n_2$. If the total amount of $NaF$, $KF$ and $LiF$ exceeds 25 cationic %, the chemical resistance of the glass deteriorates.

$LaF_3$ is an optional component and does not have any specific function. $LaF_3$ may be generally used in an amount up to 5 cationic %.

If the amount of $\frac{1}{2}Nd_2O_3$ is lower than 0.01 cationic %, it becomes difficult to oscillate the laser glass at these low amounts, while if the amount of $\frac{1}{2}Nd_2O_3$ is higher than 3 cationic %, the liquid phase temperature is increased and also density quenching of fluorescence occurs.

In order to obtain a large-sized mass of glass, it is necessary to decrease the liquid phase temperature to as low as possible. In order to achieve this, limiting the amount of each of $BaF_2$, $SrF_2$, $CaF_2$ and $MgF_2$ to a specific amount is very effective. That is, the amount of $BaF_2$ preferably ranges from 2 to 12 cationic %, the amount of $SrF_2$ preferably ranges from 4 to 18 cationic %, the amount of $CaF_2$ preferably ranges from 15 to 28% and the amount of $MgF_2$ preferably ranges from 0 to 5%.

Of the alkali metal fluorides, $NaF$ is particularly preferred to decrease the liquid phase temperature and the non-linear refractive index coefficient.

The presence of MoO$_3$, TiO$_2$, ½Nb$_2$O$_5$ and the like is effective in preventing solarization. Each of these components can be used in an amount up to 2 cationic %, but the total amount thereof must range from 0.1 to 4 cationic %.

Moreover, according to another embodiment of the present invention, ½Nd$_2$O$_3$ may be partially or completely replaced by ½Er$_2$O$_3$ and/or ½Eu$_2$O$_3$ as a laser oscillation component. In addition, AlF$_3$, YF$_3$, LaF$_3$, NaF, KF, LiF, BaF$_2$, SrF$_2$, CaF$_2$ and MgF$_2$ can be partially or completely used in the form of the phosphates or the phosphites, such as AlPO$_4$, YPO$_4$, LaPO$_4$, NaPO$_3$, KPO$_3$, K$_3$PO$_4$, Li$_3$PO$_4$, Sr(PO$_3$)$_2$, Ca$_3$(PO$_4$)$_2$, Ca(PO$_3$)$_2$, Mg$_2$P$_2$O$_7$, Ba(PO$_3$)$_2$, etc. Further, the Nd$_2$O$_3$, Er$_2$O$_3$ and Eu$_2$O$_3$ can be effectively added as the fluorides thereof, such as NdF$_3$, ErF$_3$ and EuF$_3$ respectively.

The laser glasses according to the present invention have a non-linear refractive index coefficient of 0.5 to $0.7 \times 10^{-13}$ e.s.u. and a liquid phase temperature of 550° to 750° C.

Examples of laser glasses of the present invention are shown in the Table below to explain the invention in greater detail. In the Table, each component is shown in terms of cationic %, $L_T$ is the liquid phase temperature (in ° C.) which is a measure of the stability of the glass to devitrification, and $n_2$ is the non-linear refractive index coefficient ($\times 10^{-13}$ e.s.u.).

The abbreviation "e.s.u." means electrostatic unit.

Table

| No. | | 1 | 2 | 3 | 4 | 5 | 6 | 7 | 8 | 9 | 10 |
|---|---|---|---|---|---|---|---|---|---|---|---|
| ½P$_2$O$_5$ | C | 18 | 18 | 18 | 13 | 18 | 18 | 18 | 18 | 18 | 18 |
| | M | 9.95 | 9.96 | 9.96 | 6.45 | 10.16 | 9.93 | 10.16 | 9.96 | 9.96 | 9.96 |
| | W | 14.68 | 15.52 | 14.87 | 9.56 | 13.49 | 14.03 | 13.78 | 14.87 | 14.38 | 14.43 |
| AlF$_3$ | C | 31.72 | 31.72 | 31.72 | 31.72 | 31.72 | 31.72 | 31.72 | 31.72 | 29.98 | 30.98 |
| | M | 35.06 | 35.09 | 35.09 | 33.93 | 35.81 | 35.06 | 35.81 | 38.69 | 33.17 | 34.27 |
| | W | 30.62 | 32.37 | 31.00 | 27.60 | 28.13 | 29.25 | 28.73 | 34.20 | 28.29 | 27.39 |
| YF$_3$ | C | 3.26 | 4.26 | 3.26 | 0.26 | — | 3.26 | 3.26 | — | 5 | 3 |
| | M | 3.61 | 4.71 | 3.61 | 0.28 | — | 3.61 | — | — | 5.53 | 3.32 |
| | W | 5.47 | 7.55 | 5.54 | 0.39 | — | 5.22 | — | — | 8.22 | 4.94 |
| LaF$_3$ | C | — | 1 | — | — | — | — | — | — | — | — |
| | M | — | 1.11 | — | — | — | — | — | — | — | — |
| | W | — | 2.38 | — | — | — | — | — | — | — | — |
| ½Al$_2$O$_3$ | | — | — | — | — | — | — | — | — | — | — |
| ½Y$_2$O$_3$ | C | — | — | — | — | 3.26 | — | 3.26 | — | — | — |
| | M | — | — | — | — | 1.84 | — | 1.84 | — | — | — |
| | W | — | — | — | — | 3.89 | — | 3.97 | — | — | — |
| ½La$_2$O$_3$ | C | — | — | — | — | — | — | — | — | — | 1 |
| | M | — | — | — | — | — | — | — | — | — | 1.4 |
| | W | — | — | — | — | — | — | — | — | — | 1.84 |
| BaF$_2$ | C | 5.76 | 2.76 | 5.76 | 9 | 8.6 | 7.46 | 8.03 | 6.33 | 6.33 | 6.33 |
| | M | 6.36 | 3.05 | 6.37 | 9.63 | 9.71 | 8.25 | 9.07 | 7.00 | 7.00 | 7.00 |
| | W | 11.61 | 5.88 | 11.75 | 15.92 | 14.36 | 15.18 | 12.92 | 12.49 | 12.54 | |
| SrF$_2$ | C | 7.38 | 4.38 | 7.38 | 18 | 11.02 | 9.57 | 10.29 | 8.11 | 8.11 | 8.11 |
| | M | 18.15 | 4.85 | 8.16 | 19.25 | 12.44 | 10.59 | 11.62 | 8.97 | 8.97 | 8.97 |
| | W | 10.66 | 6.69 | 10.79 | 23.42 | 14.02 | 13.20 | 13.94 | 11.86 | 11.45 | 11.51 |
| CaF$_2$ | C | 17.28 | 15.28 | 17.28 | 28 | 25.8 | 22.39 | 24.10 | 18.98 | 18.98 | 18.95 |
| | M | 19.09 | 16.90 | 19.12 | 29.95 | 29.13 | 24.77 | 27.21 | 21.00 | 21.00 | 21.00 |
| | W | 15.51 | 14.50 | 15.70 | 22.64 | 21.27 | 19.20 | 20.29 | 17.25 | 16.65 | 16.74 |
| MgF$_2$ | C | 5 | — | — | — | — | — | — | — | — | — |
| | M | 5.52 | | | | | | | | | |
| | W | 3.58 | | | | | | | | | |
| BaO | | — | — | — | — | — | — | — | — | — | — |
| SrO | | — | — | — | — | — | — | — | — | — | — |
| CaO | | — | — | — | — | — | — | — | — | — | — |
| MgO | | — | — | — | — | — | — | — | — | — | — |
| KF | | — | — | — | — | — | — | — | — | — | — |
| NaF | C | 10 | 20 | 15 | — | — | 1 | 3 | 12 | 12 | 12 |
| | M | 11.05 | 22.12 | 16.59 | — | — | 1.11 | 3.39 | 13.27 | 13.27 | 13.27 |
| | W | 9.83 | 10.21 | 7.33 | — | — | 0.46 | 1.36 | 5.87 | 5.60 | 5.69 |
| LiF | | — | — | — | — | — | 5 | — | — | — | — |
| | | | | | | | 5.53 | | | | |
| | | | | | | | 1.42 | | | | |
| ½K$_2$O | | — | — | — | — | — | — | — | — | — | — |
| ½Na$_2$O | | — | — | — | — | — | — | — | — | — | — |
| ½Li$_2$O | | — | — | — | — | — | — | — | — | — | — |
| MoO$_3$ | C | 0.4 | 1.4 | 0.4 | — | — | 0.4 | — | 0.4 | 0.4 | 0.4 |
| | M | 0.44 | 1.55 | 0.44 | — | — | 0.49 | — | 0.44 | 0.44 | 0.44 |
| | W | 0.66 | 2.45 | 0.67 | — | — | 0.63 | — | 0.67 | 0.65 | 0.64 |
| TiO$_2$ | | — | — | — | — | — | — | — | — | — | — |
| ½Nb$_2$O$_5$ | C | — | — | — | — | 0.4 | — | 0.4 | — | — | — |
| | M | — | — | — | — | 0.23 | — | 0.23 | | | |
| | W | — | — | — | — | 0.56 | — | 0.57 | — | — | — |
| NdF$_3$ | C | 0.2 | — | — | — | — | — | — | — | — | — |
| | M | 0.22 | | | | | | | | | |
| | W | 0.46 | | | | | | | | | |
| ½Nd$_2$O$_3$ | C | 1 | 1.2 | 1.2 | 0.02 | 1.2 | 1.2 | 1.2 | 1.2 | 1.2 | 1.2 |
| | M | 0.55 | 0.66 | 0.66 | 0.01 | 0.68 | 0.68 | 0.68 | 0.66 | 0.66 | 0.66 |
| | W | 1.92 | 2.45 | 2.35 | 0.03 | 2.02 | 2.23 | 2.18 | 2.36 | 2.27 | 2.28 |
| $L_T$ | | 620 | 652 | 631 | 674 | 650 | 621 | 645 | 673 | 665 | 633 |
| $n_2$ | | 0.65 | 0.62 | 0.66 | 0.70 | 0.69 | 0.65 | 0.68 | 0.60 | 0.67 | 0.63 |

| No. | | 11 | 12 | 13 | 14 | 15 | 16 | 17 | 18 | 19 | 20 |
|---|---|---|---|---|---|---|---|---|---|---|---|
| ½P$_2$O$_5$ | C | 18 | 18 | 18 | 18 | 18 | 5 | 19.2 | 25 | 15.18 | 20 |
| | M | 10.23 | 10.18 | 10.00 | 9.87 | 10.00 | 7.56 | 10.02 | 14.71 | 8.31 | 11.22 |
| | W | 14.68 | 14.65 | 14.71 | 14.64 | 14.82 | 3.84 | 11.29 | 22.55 | 12.33 | 12.12 |
| AlF$_3$ | C | 29.98 | 30.98 | 32.98 | 32.98 | 32.98 | 34.5 | 20.5 | 20.5 | 31.72 | 31.72 |
| | M | 34.11 | 35.06 | 36.66 | 30.24 | 36.66 | 35.39 | 22.69 | 24.12 | 34.76 | 35.59 |
| | W | 28.92 | 29.89 | 31.88 | 31.74 | 32.13 | 30.36 | 20.60 | 21.85 | 30.48 | 30.26 |
| YF$_3$ | C | — | — | — | 2 | — | 2 | — | 2 | 2 | 2 |
| | M | — | — | — | 2.20 | — | 2.05 | — | 2.35 | 2.19 | 2.24 |
| | W | — | — | — | 3.34 | — | 3.16 | — | 3.71 | 3.34 | 3.31 |
| LaF$_3$ | C | — | — | — | — | — | 3.2 | — | — | — | — |

| | | | | | | | | | | | |
|---|---|---|---|---|---|---|---|---|---|---|---|
| | | M | — | — | — | — | — | 3.28 | — | — | — | — |
| | | W | — | — | — | — | — | 6.70 | — | — | — | — |
| ½Al$_2$O$_3$ | | | | | | | | | | | | |
| ½Y$_2$O$_3$ | | C | 5 | 4 | 2 | — | 2 | — | — | — | — | — |
| | | M | 2.84 | 2.26 | 1.11 | — | 1.11 | — | — | — | — | — |
| | | W | 6.49 | 5.19 | 2.60 | — | 2.62 | — | — | — | — | — |
| ½La$_2$O$_3$ | | | — | — | — | — | — | — | — | — | — | — |
| BaF$_2$ | | C | 6.33 | 6.33 | 6.33 | 6.33 | 6.33 | 6.44 | 6.44 | 4.40 | 6.44 | 6.44 |
| | | M | 7.20 | 7.16 | 7.03 | 6.96 | 7.03 | 6.01 | 71.2 | 5.15 | 7.05 | 7.22 |
| | | W | 12.76 | 12.75 | 12.78 | 12.72 | 12.87 | 13.30 | 13.50 | 9.80 | 12.92 | 12.83 |
| SrF$_2$ | | C | 8.11 | 8.11 | 8.11 | 8.11 | 8.11 | 8.21 | 8.21 | 6.25 | 8.21 | 8.21 |
| | | M | 7.23 | 9.17 | 9.01 | 8.91 | 9.01 | 8.42 | 9.08 | 7.35 | 8.99 | 9.21 |
| | | W | 11.71 | 11.70 | 11.73 | 11.67 | 11.82 | 11.16 | 12.33 | 9.98 | 11.80 | 11.72 |
| CaF$_2$ | | C | 18.98 | 18.98 | 18.98 | 18.98 | 18.98 | 19.05 | 19.05 | 15.25 | 19.05 | 19.05 |
| | | M | 21.59 | 21.47 | 21.09 | 20.86 | 21.09 | 19.54 | 21.07 | 17.94 | 20.80 | 21.37 |
| | | W | 17.03 | 17.02 | 17.06 | 16.78 | 17.19 | 16.10 | 17.78 | 15.13 | 17.02 | 16.90 |
| MgF$_2$ | | | — | — | — | — | — | — | — | — | — | — |
| BaO | | | — | — | — | — | — | — | — | — | — | — |
| SrO | | | — | — | — | — | — | — | — | — | — | — |
| CaO | | | — | — | — | — | — | — | — | — | — | — |
| MgO | | | — | — | — | — | — | — | — | — | — | — |
| KF | | C | — | — | — | — | — | 20 | 20 | 5 | 2 | 1 |
| | | M | — | — | — | — | — | 20.51 | 22.12 | 5.88 | 2.19 | 1.12 |
| | | W | — | — | — | — | — | 12.58 | 13.89 | 3.69 | 1.33 | 0.66 |
| NaF | | C | 10 | 12 | 12 | 12 | 12 | — | 5 | 15 | 10 | 6.67 |
| | | M | 11.38 | 13.57 | 13.33 | 13.19 | 13.33 | — | 5.53 | 17.65 | 10.95 | 7.48 |
| | | W | 4.83 | 5.79 | 5.80 | 5.77 | 5.84 | — | 2.51 | 8.00 | 8.00 | 3.18 |
| LiF | | | 2 | — | — | — | — | — | — | — | — | — |
| ½K$_2$O | | C | — | — | — | — | — | — | — | — | — | 1.71 |
| | | M | — | — | — | — | — | — | — | — | — | 0.96 |
| | | W | — | — | — | — | — | — | — | — | — | 0.91 |
| ½Na$_2$O | | C | — | — | — | — | — | — | — | 5 | — | — |
| | | M | — | — | — | — | — | — | — | 2.94 | — | — |
| | | W | — | — | — | — | — | — | — | 1.97 | — | — |
| ½Li$_2$O | | C | — | — | — | — | — | — | — | — | 2.2 | — |
| | | M | — | — | — | — | — | — | — | — | 1.20 | — |
| | | W | — | — | — | — | — | — | — | — | 0.38 | — |
| MoO$_3$ | | C | 0.4 | 0.4 | 0.4 | — | — | 0.4 | 0.4 | 0.4 | 2 | — |
| | | M | 0.46 | 0.45 | 0.44 | — | — | 0.41 | 0.44 | 0.47 | 2.19 | — |
| | | W | 0.66 | 0.66 | 0.66 | — | — | 0.62 | 0.69 | 0.73 | 3.29 | — |
| TiO$_2$ | | C | — | — | — | 0.4 | 0.4 | — | — | — | — | 2 |
| | | M | — | — | — | 0.44 | 0.44 | — | — | — | — | 2.24 |
| | | W | — | — | — | 0.39 | 0.37 | — | — | — | — | 1.82 |
| ½Nb$_2$O$_5$ | | | — | — | — | — | — | — | — | — | — | — |
| NdF$_3$ | | C | — | — | 1.2 | 1.2 | — | — | — | — | — | — |
| | | M | — | — | 1.33 | 1.32 | — | — | — | — | — | — |
| | | W | — | — | 2.78 | 2.77 | — | — | — | — | — | — |
| ½Nd$_2$O$_3$ | | C | 1.2 | 1.2 | — | — | 1.2 | 1.2 | 1.2 | 1.2 | 1.2 | 1.2 |
| | | M | 0.68 | 0.68 | — | — | 1.33 | 1.23 | 1.33 | 1.41 | 1.31 | 1.35 |
| | | W | 2.32 | 2.32 | — | — | 2.34 | 3.18 | 2.41 | 2.56 | 2.31 | 2.29 |
| $L_T$ | | | 653 | 641 | 659 | 643 | 658 | 903 | 682 | 700 | 620 | 615 |
| $n_2$ | | | 0.70 | 0.69 | 0.67 | 0.64 | 0.67 | 0.54 | 0.61 | 0.78 | 0.60 | 0.66 |

| | | | | | | | | | | | |
|---|---|---|---|---|---|---|---|---|---|---|---|
| No. | | | 21 | 22 | 23 | 24 | 25 | 26 | 27 | 28 | 29 | 30 |
| ½P$_2$O$_5$ | | C | 20 | 20 | 20 | 20 | 19 | 19 | 20 | 20 | 18 | 18 |
| | | M | 11.31 | 11.47 | 11.17 | 10.20 | 10.50 | 10.67 | 11.50 | 11.86 | 10.68 | 9.96 |
| | | W | 16.59 | 16.72 | 16.06 | 16.02 | 14.85 | 15.02 | 17.18 | 15.78 | 14.81 | 14.71 |
| AlF$_3$ | | C | 31.72 | 24.5 | 29.5 | 29.48 | 29.48 | 29.48 | 24.5 | 21.72 | 31.72 | 31.72 |
| | | M | 35.88 | 28.13 | 32.97 | 33.03 | 32.58 | 33.13 | 28.19 | 25.73 | 37.65 | 35.10 |
| | | W | 31.14 | 24.24 | 28.03 | 27.94 | 27.29 | 27.60 | 23.17 | 22.07 | 30.88 | 30.68 |
| YF$_3$ | | C | 2 | — | 2 | 1.38 | — | — | — | — | 2 | 2 |
| | | M | 2.26 | — | 2.23 | 1.55 | — | — | — | — | 2.37 | 2.21 |
| | | W | 3.41 | — | 3.30 | 2.27 | — | — | — | — | 3.38 | 3.36 |
| LaF$_3$ | | C | — | — | — | — | 5 | 2 | — | — | — | — |
| | | M | — | — | — | 5.52 | 2.25 | — | — | — | — | — |
| | | W | — | — | — | 10.80 | 4.37 | — | — | — | — | — |
| ½Al$_2$O$_3$ | | C | — | 5 | — | — | — | — | — | 10 | — | — |
| | | M | — | 2.87 | — | — | — | — | — | 5.92 | — | — |
| | | W | — | 3.00 | — | — | — | — | — | 6.17 | — | — |
| ½Y$_2$O$_3$ | | | — | — | — | — | — | — | — | — | — | — |
| ½La$_2$O$_3$ | | C | — | — | — | — | — | — | 5 | — | — | — |
| | | M | — | — | — | — | — | — | 2.88 | — | — | — |
| | | W | — | — | — | — | — | — | 9.17 | — | — | — |
| BaF$_2$ | | C | 3.72 | 6.44 | 6.44 | 6.44 | 6.44 | 6.44 | 6.44 | 6.44 | 6.44 | 6.44 |
| | | M | 9.21 | 7.39 | 7.20 | 7.22 | 7.12 | 7.24 | 7.41 | 7.63 | 7.64 | 7.12 |
| | | W | 7.02 | 13.30 | 12.77 | 12.74 | 12.45 | 12.59 | 12.71 | 13.66 | 13.09 | 13.00 |
| SrF$_2$ | | C | 8.21 | 8.21 | 8.21 | 8.21 | 8.21 | 8.21 | 8.21 | 8.21 | 8.21 | 8.21 |
| | | M | 9.29 | 9.42 | 9.17 | 9.20 | 9.07 | 9.22 | 9.45 | 9.73 | 9.74 | 9.08 |
| | | W | 12.05 | 12.15 | 11.66 | 11.64 | 11.37 | 11.50 | 11.61 | 12.48 | 11.96 | 11.88 |
| CaF$_2$ | | C | 19.05 | 19.05 | 19.05 | 19.05 | 19.05 | 19.05 | 19.05 | 19.05 | 19.05 | 19.05 |
| | | M | 21.55 | 21.86 | 21.28 | 21.34 | 21.05 | 21.40 | 21.92 | 22.57 | 22.61 | 21.07 |
| | | W | 17.39 | 17.53 | 16.82 | 16.78 | 16.39 | 16.58 | 16.75 | 18.00 | 17.24 | 17.13 |
| MgF$_2$ | | | — | — | — | — | — | — | — | — | — | — |
| BaO | | C | — | — | — | — | — | — | — | — | 0.68 | — |
| | | M | — | — | — | — | — | — | — | — | 0.81 | — |
| | | W | — | — | — | — | — | — | — | — | 1.21 | — |
| SrO | | C | — | — | — | — | — | — | — | 0.94 | — | — |
| | | M | — | — | — | — | — | — | — | 1.11 | — | — |
| | | W | — | — | — | — | — | — | — | 1.18 | — | — |
| CaO | | C | — | — | — | — | — | — | 3.16 | — | — | — |
| | | M | — | — | — | — | — | — | 3.64 | — | — | — |
| | | W | — | — | — | — | — | — | 2.00 | — | — | — |
| MgO | | C | — | — | — | — | — | — | — | — | — | 0.94 |
| | | M | — | — | — | — | — | — | — | — | — | 1.04 |

Table-continued

| | | | | | | | | | | | |
|---|---|---|---|---|---|---|---|---|---|---|---|
| | W | — | — | — | — | — | — | — | — | — | 0.44 |
| KF | C | 2.1 | 2.1 | — | — | — | — | — | — | — | — |
| | M | 2.38 | 2.41 | | | | | | | | |
| | W | 1.43 | 1.44 | | | | | | | | |
| NaF | C | 10 | 10 | 12.04 | 12.04 | 12.01 | 7.8 | 12.04 | 12.04 | — | 12.04 |
| | M | 11.31 | 11.47 | 13.45 | 13.49 | 13.27 | 8.76 | 13.86 | 14.27 | | 13.32 |
| | W | 4.91 | 4.95 | 5.72 | 5.70 | 5.56 | 3.65 | 5.69 | 6.12 | | 5.82 |
| LiF | | — | — | — | — | — | — | — | — | — | — |
| ½K₂O | C | — | — | — | — | — | 4.62 | | | | |
| | M | | | | | | 5.19 | | | | |
| | W | | | | | | 2.43 | | | | |
| ½Na₂O | | — | — | — | — | — | — | — | — | 12.3 | — |
| | | | | | | | | | | 7.33 | |
| | | | | | | | | | | 4.92 | |
| ½Li₂O | | — | — | — | — | — | — | — | — | — | — |
| MoO₃ | C | — | 2 | 0.4 | 0.4 | 0.8 | 0.4 | 0.4 | 0.4 | 0.4 | 0.4 |
| | M | — | 2.29 | 0.45 | 0.45 | 0.88 | 0.45 | 0.46 | 0.47 | 0.47 | 0.44 |
| | W | — | 3.39 | 0.15 | 0.65 | 1.27 | 0.64 | 0.65 | 0.70 | 0.67 | 0.66 |
| TiO₂ | C | — | 2 | — | — | — | — | — | — | — | — |
| | M | — | 2.29 | | | | | | | | |
| | W | — | 1.89 | | | | | | | | |
| ½Nb₂O₅ | C | 2 | — | — | — | — | — | — | — | — | — |
| | M | 1.13 | — | — | — | — | — | — | — | — | — |
| | W | 3.10 | — | — | — | — | — | — | — | — | — |
| NdF₃ | C | — | — | 1.36 | 1.5 | 0.05 | — | — | — | — | — |
| | M | — | — | 1.52 | 1.68 | 0.01 | | | | | |
| | W | — | — | 3.10 | 3.41 | 0.02 | | | | | |
| ½Nd₂O₃ | C | 1.2 | 0.7 | 1 | 1.5 | — | 3 | 1.2 | 1.2 | 1.2 | 1.2 |
| | M | 0.68 | 0.40 | 0.56 | 0.84 | — | 1.69 | 0.69 | 0.71 | 0.7 | 0.66 |
| | W | 2.36 | 1.39 | 1.90 | 2.85 | — | 5.62 | 2.27 | 2.44 | 2.34 | 2.32 |
| L_T | | 630 | 760 | 631 | 637 | 687 | 710 | 820 | 835 | 755 | 629 |
| n₂ | | 0.67 | 0.68 | 0.66 | 0.66 | 0.72 | 0.69 | 0.75 | 0.73 | 0.69 | 0.64 |

| No. | | 31 | 32 | 33 | 34 | 35 | 36 | 37 | 38 | 39 | 40 |
|---|---|---|---|---|---|---|---|---|---|---|---|
| ½P₂O₅ | C | 18 | 18 | 18 | 18 | 18 | 18 | 18 | 18 | 18 | 18 |
| | M | 9.9 | 9.9 | 9.96 | 9.96 | 9.96 | 9.96 | 9.96 | 9.96 | 9.96 | 9.96 |
| | W | 14.73 | 14.66 | 14.70 | 14.66 | 14.74 | 14.79 | 14.69 | 15.02 | 14.91 | 14.80 |
| AlF₃ | C | 32.98 | 32.98 | 32.98 | 32.98 | 30.98 | 29.98 | 28.98 | 30.98 | 29.48 | 28.48 |
| | M | 36.48 | 36.56 | 36.48 | 36.98 | 34.27 | 33.16 | 32.06 | 34.27 | 32.61 | 31.50 |
| | W | 31.94 | 31.80 | 31.88 | 31.79 | 30.01 | 27.31 | 28.91 | 30.61 | 28.89 | 27.70 |
| YF₃ | C | 2 | 2 | 2 | 2 | 2 | 2 | 2 | — | 1.5 | 2.5 |
| | M | 2.21 | 2.21 | 2.21 | 2.21 | 2.21 | 2.21 | 2.21 | — | 1.66 | 2.77 |
| | W | 3.36 | 3.35 | 3.36 | 3.95 | 3.37 | 3.37 | 3.35 | — | 2.55 | 4.23 |
| LaF₃ | | — | — | — | — | — | — | — | — | — | — |
| ½Al₂O₃ | | | | | | | | | | | |
| ½Y₂O₃ | | | | | | | | | | | |
| ½La₂O₃ | | — | — | — | — | — | — | — | — | — | — |
| BaF₂ | C | 6.33 | 6.33 | 6.33 | 6.33 | 6.33 | 6.33 | 6.33 | 6.33 | 6.33 | 6.33 |
| | M | 7.00 | 7.02 | 7.00 | 7.00 | 7.00 | 7.00 | 7.00 | 7.00 | 7.00 | 7.00 |
| | W | 12.80 | 12.75 | 12.78 | 12.74 | 12.80 | 12.83 | 12.74 | 13.05 | 12.95 | 12.86 |
| SrF₂ | C | 8.11 | 8.11 | 8.11 | 8.11 | 8.11 | 8.11 | 8.11 | 8.11 | 8.11 | 8.11 |
| | M | 8.97 | 8.99 | 8.97 | 8.97 | 8.97 | 8.97 | 8.97 | 8.97 | 8.97 | 8.97 |
| | W | 11.75 | 11.70 | 11.73 | 11.69 | 11.75 | 11.78 | 11.70 | 11.98 | 11.89 | 11.80 |
| CaF₂ | C | 18.98 | 18.98 | 18.98 | 18.98 | 18.98 | 18.98 | 18.98 | 18.98 | 18.98 | 18.98 |
| | M | 21.00 | 21.04 | 21.00 | 21.00 | 21.00 | 21.00 | 21.00 | 21.00 | 21.00 | 21.00 |
| | W | 17.09 | 17.02 | 17.06 | 17.01 | 17.09 | 17.14 | 17.01 | 17.43 | 17.29 | 17.17 |
| MgF₂ | C | — | — | — | — | 2 | 3 | 4 | 4 | 4 | 4 |
| | M | — | — | — | — | 2.21 | 3.32 | 4.42 | 4.42 | 4.42 | 4.42 |
| | W | — | — | — | — | 1.44 | 1.95 | 2.86 | 2.93 | 2.91 | 2.89 |
| BaO | | — | — | — | — | — | — | — | — | — | — |
| SrO | | — | — | — | — | — | — | — | — | — | — |
| CaO | | — | — | — | — | — | — | — | — | — | — |
| MgO | | — | — | — | — | — | — | — | — | — | — |
| KF | | — | — | — | — | — | — | — | — | — | — |
| NaF | C | 12.4 | 12 | 12 | 12 | 12 | 12 | 12 | 12 | 12 | 12 |
| | M | 13.72 | 13.30 | 13.27 | 13.27 | 13.27 | 13.27 | 13.27 | 13.27 | 13.27 | 13.27 |
| | W | 6.00 | 5.79 | 5.80 | 5.78 | 5.81 | 5.83 | 5.78 | 5.93 | 5.88 | 5.84 |
| LiF | | — | — | — | — | — | — | — | — | — | — |
| ½K₂O | | — | — | — | — | — | — | — | — | — | — |
| ½K₂O | | — | — | — | — | — | — | — | — | — | — |
| ½Li₂O | | — | — | — | — | — | — | — | — | — | — |
| MoO₃ | C | — | — | — | 0.4 | 0.4 | 0.4 | 0.4 | 0.4 | — | — |
| | M | — | — | — | 0.45 | 0.45 | 0.45 | 0.45 | 0.45 | — | — |
| | W | — | — | — | 0.66 | 0.66 | 0.67 | 0.66 | 0.68 | — | — |
| TiO₂ | C | — | — | 0.44 | — | — | — | — | — | 0.4 | 0.4 |
| | M | — | — | 0.45 | — | — | — | — | — | 0.45 | 0.45 |
| | W | — | — | 0.37 | — | — | — | — | — | 0.37 | 0.37 |
| ½Nb₂O₅ | C | — | 0.4 | — | — | — | — | — | — | — | — |
| | M | — | 0.22 | — | — | — | — | — | — | — | — |
| | W | — | 0.61 | — | — | — | — | — | — | — | — |
| NdF₃ | | — | — | — | — | — | — | — | — | — | — |
| ½Nd₂O₃ | C | 1.2 | 1.2 | 1.2 | 1.2 | 1.2 | 1.2 | 1.2 | 1.2 | 1.2 | 1.2 |
| | M | 0.66 | 0.69 | 0.66 | 0.66 | 0.66 | 0.66 | 0.66 | 0.66 | 0.66 | 0.66 |
| | W | 2.33 | 2.32 | 2.32 | 2.32 | 2.33 | 2.33 | 2.32 | 2.37 | 2.36 | 2.34 |
| L_T | | 600 | 632 | 610 | 605 | 600 | 597 | 580 | 621 | 592 | 602 |
| n₂ | | 0.63 | 0.66 | 0.65 | 0.67 | 0.65 | 0.64 | 0.63 | 0.62 | 0.63 | 0.64 |

| No. | | 41 | 42 | 43 | 44 | 45 | 46 | 47 | 48 | 49 | 50 |
|---|---|---|---|---|---|---|---|---|---|---|---|
| ½P₂O₅ | C | 18 | 18 | 18 | 18 | 18 | 18 | 18 | 18 | 18 | 18 |
| | M | 9.96 | 9.96 | 9.96 | 9.98 | 10.00 | 9.98 | 9.98 | 9.98 | 9.98 | 10.00 |
| | W | 14.75 | 14.65 | 14.34 | 14.47 | 14.59 | 14.78 | 14.48 | 14.64 | 14.86 | 14.19 |
| AlF₃ | C | 27.98 | 27.48 | 27.48 | 27.48 | 27.48 | 28.48 | 28.48 | 28.48 | 28.48 | 28.48 |
| | M | 30.95 | 30.40 | 30.40 | 30.46 | 30.54 | 31.59 | 31.59 | 31.59 | 31.59 | 31.66 |

Table-continued

| | | | | | | | | | | |
|---|---|---|---|---|---|---|---|---|---|---|
| YF₃ | W | 27.12 | 26.47 | 25.89 | 26.01 | 26.36 | 27.68 | 27.10 | 27.42 | 27.65 | 26.58 |
| | C | 3 | 3.5 | 3.5 | 3.5 | 3.0 | 2 | 2 | 2 | 2 | 2 |
| | M | 3.32 | 3.87 | 3.87 | 3.88 | 3.34 | 2.22 | 2.22 | 2.22 | 2.22 | 2.23 |
| | W | 5.05 | 5.86 | 5.93 | 5.89 | 5.00 | 3.38 | 3.30 | 3.34 | 3.38 | 3.24 |
| LaF₃ | | — | — | — | — | — | — | — | — | — | — |
| ½Al₂O₃ | C | — | — | — | — | — | 0.5 | 0.5 | 0.5 | 0.5 | 0.5 |
| | M | — | — | — | — | — | 0.28 | 0.28 | 0.28 | 0.28 | 0.28 |
| | W | — | — | — | — | — | 0.29 | 0.29 | 0.29 | 0.30 | 0.28 |
| ½Y₂O₃ | | — | — | — | — | — | — | — | — | — | — |
| ½La₂O₃ | | — | — | — | — | 0.5 | — | — | — | — | — |
| | | | | | | 0.28 | | | | | |
| | | | | | | 0.90 | | | | | |
| BaF₂ | C | 6.33 | 6.33 | 6.33 | 6.33 | 6.33 | 6.33 | 6.33 | 6.33 | 6.33 | 6.33 |
| | M | 7.00 | 7.00 | 7.00 | 7.02 | 7.04 | 7.02 | 7.02 | 7.02 | 7.02 | 7.04 |
| | W | 12.81 | 12.73 | 12.45 | 12.80 | 12.68 | 12.84 | 12.58 | 12.72 | 12.86 | 12.33 |
| SrF₂ | C | 8.11 | 8.11 | 8.11 | 8.11 | 8.11 | 8.11 | 8.11 | 8.11 | 8.11 | 8.11 |
| | M | 8.97 | 8.97 | 8.97 | 8.99 | 9.02 | 9.00 | 9.00 | 9.00 | 9.00 | 9.02 |
| | W | 11.76 | 11.68 | 11.43 | 11.75 | 11.64 | 11.79 | 11.55 | 11.68 | 11.81 | 11.33 |
| CaF₂ | C | 18.98 | 18.98 | 18.98 | 18.98 | 18.98 | 18.98 | 18.98 | 18.98 | 18.98 | 18.98 |
| | M | 21.00 | 21.00 | 21.00 | 21.04 | 21.10 | 21.05 | 21.05 | 21.05 | 21.05 | 21.10 |
| | W | 17.11 | 17.00 | 16.63 | 17.09 | 16.93 | 17.15 | 16.79 | 16.99 | 17.17 | 16.46 |
| MgF₂ | C | 4 | 4 | 4 | 4 | 4 | 4 | 4 | 2 | 2 | — |
| | M | 4.42 | 4.42 | 4.42 | 4.43 | 4.45 | 4.44 | 2.22 | 2.22 | 2.22 | — |
| | W | 2.88 | 2.86 | 2.80 | 2.87 | 2.85 | 2.88 | 1.41 | 1.43 | 1.44 | — |
| BaO | C | — | — | — | — | — | — | 2 | — | — | 4 |
| | M | — | — | — | — | — | — | 2.22 | — | — | 4.44 |
| | W | — | — | — | — | — | — | 3.48 | — | — | 6.81 |
| SrO | C | — | — | — | — | — | — | — | 2 | — | — |
| | M | — | — | — | — | — | — | — | 2.22 | — | — |
| | W | — | — | — | — | — | — | — | 2.38 | — | — |
| CaO | C | — | — | — | — | — | — | — | — | 2 | — |
| | M | — | — | — | — | — | — | — | — | 2.22 | — |
| | W | — | — | — | — | — | — | — | — | 1.30 | — |
| MgO | | — | — | — | — | — | — | — | — | — | — |
| KF | C | — | — | 12 | 2 | 2 | 2 | 2 | 2 | 2 | 2 |
| | M | — | — | 13.27 | 2.22 | 2.22 | 2.22 | 2.22 | 2.22 | 2.22 | 2.22 |
| | W | — | — | 7.82 | 1.34 | 1.33 | 1.34 | 1.32 | 1.33 | 1.35 | 1.29 |
| NaF | C | 12 | 12 | — | 10 | 10 | 10 | 10 | 10 | 10 | 10 |
| | M | 13.27 | 13.27 | — | 11.09 | 11.12 | 11.09 | 11.09 | 11.09 | 11.09 | 11.12 |
| | W | 5.82 | 5.78 | — | 9.84 | 4.80 | 4.86 | 4.76 | 4.81 | 4.87 | 4.66 |
| LiF | | — | — | — | — | — | — | — | — | — | — |
| ½K₂O | | — | — | — | — | — | — | — | — | — | — |
| ½Na₂O | | — | — | — | — | — | — | — | — | — | — |
| ½Li₂O | | — | — | — | — | — | — | — | — | — | — |
| MoO₃ | C | — | 0.4 | 0.4 | — | — | 0.4 | 0.4 | 0.4 | 0.4 | — |
| | M | — | 0.45 | 0.45 | — | — | 0.44 | 0.44 | 0.44 | 0.94 | — |
| | W | — | 0.66 | 0.65 | — | — | 0.67 | 0.65 | 0.66 | 0.67 | — |
| TiO₂ | C | 0.4 | — | — | — | — | — | — | — | — | — |
| | M | 0.45 | — | — | — | — | — | — | — | — | — |
| | W | 0.37 | — | — | — | — | — | — | — | — | — |
| ½Nb₂O₅ | C | — | — | — | 0.4 | 0.4 | — | — | — | — | 0.4 |
| | M | — | — | — | 0.22 | 0.22 | — | — | — | — | 0.22 |
| | W | — | — | — | 0.61 | 0.61 | — | — | — | — | 0.59 |
| NdF₃ | | — | — | — | — | — | — | — | — | — | — |
| ½Nd₂O₃ | C | 1.2 | 1.2 | 1.2 | 1.2 | 1.2 | 1.2 | 1.2 | 1.2 | 1.2 | 1.2 |
| | M | 0.66 | 0.66 | 0.66 | 0.67 | 0.67 | 0.67 | 0.67 | 0.67 | 0.67 | 0.67 |
| | W | 2.33 | 2.31 | 2.26 | 2.33 | 2.34 | 2.34 | 2.29 | 2.31 | 2.34 | 2.24 |
| $L_T$ | | 610 | 613 | 627 | 615 | 641 | 605 | 631 | 624 | 619 | 662 |
| $n_2$ | | 0.65 | 0.67 | 0.63 | 0.64 | 0.68 | 0.65 | 0.67 | 0.67 | 0.66 | 0.68 |

| No. | | 51 | 52 | 53 | 54 | 55 | 56 | 57 | 58 | 59 | 60 |
|---|---|---|---|---|---|---|---|---|---|---|---|
| ½P₂O₅ | C | 18 | 18 | 18 | 18 | 18 | 18 | 18 | 18 | 18 | 18 |
| | M | 10.00 | 10.00 | 10.00 | 9.96 | 9.96 | 9.96 | 9.96 | 9.96 | 9.96 | 9.96 |
| | W | 14.51 | 14.83 | 14.94 | 14.94 | 15.01 | 15.45 | 14.15 | 14.16 | 14.29 | 14.12 |
| AlF₃ | C | 28.48 | 28.48 | 28.48 | 32.98 | 32.98 | 32.98 | 32.98 | 32.98 | 32.98 | 32.98 |
| | M | 31.66 | 31.66 | 31.66 | 36.48 | 36.48 | 36.48 | 36.48 | 36.48 | 36.48 | 36.48 |
| | W | 27.18 | 27.77 | 27.98 | 32.43 | 32.55 | 33.49 | 30.70 | 30.70 | 30.99 | 30.10 |
| YF₃ | C | 2 | 2 | 2 | 2 | 2 | 2 | 2 | 2 | 2 | 2 |
| | M | 2.23 | 2.23 | 2.23 | 2.21 | 2.21 | 2.21 | 2.21 | 2.21 | 2.21 | 2.21 |
| | W | 3.31 | 3.39 | 3.41 | 3.41 | 3.43 | 3.53 | 3.24 | 3.23 | 3.27 | 3.22 |
| LaF₃ | | — | — | — | — | — | — | — | — | — | — |
| ½Al₂O₃ | C | 0.5 | 0.5 | 0.5 | — | — | — | — | — | — | — |
| | M | 0.28 | 0.28 | 0.28 | — | — | — | — | — | — | — |
| | W | 0.29 | 0.30 | 0.30 | — | — | — | — | — | — | — |
| ½Y₂O₃ | | — | — | — | — | — | — | — | — | — | — |
| ½La₂O₃ | | — | — | — | — | — | — | — | — | — | — |
| BaF₂ | C | 6.33 | 6.33 | 6.33 | — | 6.33 | 6.33 | 6.33 | 6.33 | 6.33 | 6.33 |
| | M | 7.04 | 7.04 | 7.04 | — | 7.00 | 7.00 | 7.00 | 7.00 | 7.00 | 7.00 |
| | W | 12.06 | 12.89 | 12.98 | — | 13.04 | 13.42 | 12.31 | 12.30 | 12.42 | 12.26 |
| SrF₂ | C | 8.11 | 8.11 | 8.11 | 8.11 | — | 8.11 | 8.11 | 8.11 | 8.11 | 8.11 |
| | M | 9.00 | 9.00 | 9.00 | 8.97 | — | 8.97 | 8.97 | 5.65 | 8.97 | 8.97 |
| | W | 11.57 | 11.83 | 11.92 | 11.92 | — | 12.32 | 11.30 | 11.29 | 11.40 | 11.26 |
| CaF₂ | C | 18.98 | 18.98 | 18.98 | 18.98 | 18.98 | — | 18.98 | 18.98 | 14.98 | 12.98 |
| | M | 21.05 | 21.05 | 21.05 | 21.00 | 21.00 | — | 21.00 | 21.00 | 16.58 | 14.36 |
| | W | 16.84 | 17.20 | 17.33 | 17.33 | 17.33 | — | 16.43 | 16.42 | 16.58 | 16.38 |
| MgF₂ | | — | — | — | — | — | — | — | — | — | — |
| BaO | C | — | — | — | 6.33 | — | — | 2 | — | — | — |
| | M | — | — | — | 7.00 | — | — | 2.21 | — | — | — |
| | W | — | — | — | 11.35 | — | — | 3.40 | — | — | — |
| SrO | C | 4 | — | — | — | 8.11 | — | — | 3 | — | — |
| | M | 4.44 | — | — | — | 8.97 | — | — | 3.32 | — | — |
| | W | 9.71 | — | — | — | 9.58 | — | — | 3.44 | — | — |
| CaO | C | — | 4 | — | — | — | 18.98 | — | — | 4 | 6 |
| | M | — | 4.44 | — | — | — | 21.00 | — | — | 4.42 | 6.64 |

Table-continued

|  |  |  |  |  |  |  |  |  |  |  |  |
|---|---|---|---|---|---|---|---|---|---|---|---|
|  | W | — | 2.60 | — | — | — | 12.87 | — | — | 2.51 | 3.72 |
| MgO | C | — | — | 4 | — | — | — | — | — | — | — |
|  | M | — | — | 4.44 | — | — | — | — | — | — | — |
|  | W | — | — | 1.89 | — | — | — | — | — | — | — |
| KG | C | 2 | 2 | — | — | — | — | — | — | — | — |
|  | M | 2.22 | 2.22 | 2.22 | — | — | — | — | — | — | — |
|  | W | 1.32 | 1.35 | 1.36 | — | — | — | — | — | — | — |
| NaF | C | 10 | 10 | 10 | 12 | 12 | 12 | 12 | 12 | 12 | 12 |
|  | M | 11.12 | 11.12 | 11.12 | 13.27 | 13.27 | 13.27 | 13.27 | 13.27 | 13.27 | 13.27 |
| LiF | W | 4.77 | 4.88 | 4.91 | 5.89 | 5.92 | 6.09 | 5.59 | 5.58 | 5.64 | 5.57 |
| ½K$_2$O |  | — | — | — | — | — | — | — | — | — | — |
| ½Na$_2$O |  | — | — | — | — | — | — | — | — | — | — |
| ½Li$_2$O |  | — | — | — | — | — | — | — | — | — | — |
| MoO$_3$ | C | — | — | — | — | — | — | 0.4 | 0.4 | 0.4 | 0.4 |
|  | M | — | — | — | — | — | — | 0.44 | 0.44 | 0.44 | 0.44 |
|  | W | — | — | — | — | — | — | 0.64 | 0.64 | 0.64 | 0.64 |
| TiO$_2$ | C | — | — | — | 0.4 | 0.4 | 0.4 | — | — | — | — |
|  | M | — | — | — | 0.44 | 0.44 | 0.44 | — | — | — | — |
|  | W | — | — | — | 0.37 | 0.38 | 0.39 | — | — | — | — |
| ½Nb$_2$O$_5$ | C | 0.4 | 0.4 | 0.4 | — | — | — | — | — | — | — |
|  | M | 0.22 | 0.22 | 0.22 | — | — | — | — | — | — | — |
|  | W | 0.60 | 0.62 | 0.62 | — | — | — | — | — | — | — |
| NdF$_3$ |  | — | — | — | — | — | — | — | — | — | — |
| ½Nd$_2$O$_3$ | C | 1.2 | 1.2 | 1.2 | 1.2 | 1.2 | 1.2 | 1.2 | 1.2 | 1.2 | 1.2 |
|  | M | 0.67 | 0.67 | 0.67 | 0.67 | 0.67 | 0.67 | 0.67 | 0.67 | 0.67 | 0.67 |
|  | W | 2.27 | 2.34 | 2.36 | 2.36 | 2.37 | 2.44 | 2.24 | 2.24 | 2.26 | 2.23 |
| L$_T$ |  | 643 | 640 | 637 | 722 | 750 | 832 | 670 | 710 | 712 | 723 |
| n$_2$ |  | 0.68 | 0.66 | 0.64 | 0.71 | 0.72 | 0.74 | 0.68 | 0.68 | 0.69 | 0.70 |

C: Cationic %
M: Mol %
W: Weight %

For the preparation of the fluorophosphate-base laser glasses of the present invention as shown in the Table above the components are sufficiently mixed, melted, stirred and refined over a period of about 2 to 10 hrs. at about 1,000° C. in a ceramic crucible or a fire-resistant metal crucible, and the resulting melt was molded. As a result, the glass could be obtained as a large-sized mass without devitrification in spite of the fact that the amount of the glass forming oxides is very small.

While the invention has been described in detail and with reference to specific embodiments thereof, it will be apparent to one skilled in the art that various changes and modifications can be made therein without departing from the spirit and scope thereof.

What is claimed is:

1. A stable fluorophosphate-base laser glass having a non-linear refractive index coefficient of 0.5 to 0.7 × $10^{-13}$ e.s.u. and a liquid phase temperature of 550° to 750° C. consisting essentially of 5 to 25% ½P$_2$O$_5$ and the remainder being a mixture of fluorides of the metals Al, Ba, Sr and Ca, and 0 to 25% fluorides of Na, K and Li and 0 to 5% of each of the fluorides of Y, La and Mg, and 0.01 to 3% of at least one laser oscillation component selected from the group consisting of ½ Er$_2$O$_3$, ½ Eu$_2$O$_3$ and ½Nd$_2$O$_3$ incorporated into said glass, said percentages being cationic %, said glass not containing any glass forming component which would adversely affect laser oscillation efficiency thereof.

2. The fluorophosphate-base laser glass as claimed in claim 1, further including 0.1 to 4 cationic % MoO$_3$+λ TiO$_2$+½Nb$_2$O$_5$ as components for preventing occurrence of solarization.

3. The fluorophosphate-base laser glass as claimed in claim 1, wherein said laser oscillation component is ½Nd$_2$O$_3$.

4. A stable fluorophosphate-base laser glass having a non-linear refractive index coefficient of 0.5 to 0.7 × $10^{-13}$ e.s.u. and a liquid phase temperature of 550° to 750° C. consisting essentially of 5 to 25% ½P$_2$O$_5$, 20 to 35% AlF$_3$, 0 to 5% YF$_3$, 22 to 55% BaF$_2$ + SrF$_2$ + CaF$_2$ + MgF$_2$, 0 to 25% NaF+LiF+KF and 0.01 to 3% of at least one laser oscillation component selected from the group consisting of ½ Er$_2$O$_3$, ½Eu$_2$O$_3$ and ½Nd$_2$O$_3$, said percentages being cationic %, said glass not containing any glass forming component which would adversely affect laser oscillation efficiency thereof.

5. The fluorophosphate-base laser glass as claimed in claim 4, further including 0.1 to 4 cationic % MoO$_3$+λ TiO$_2$+½Nb$_2$O$_5$ as components for preventing the occurrence of solarization.

6. The fluorophosphate-base laser glass as claimed in claim 4, wherein said laser oscillation component is ½Nd$_2$O$_3$.

7. A stable fluorphosphate-base laser glass having a non-linear refractive index coefficient of 0.5 to 0.7 × $10^{-13}$ e.s.u. and a liquid phase temperature of 550° to 750° C. consisting essentially of 5 to 25% ½P$_2$O$_5$, 20 to 35% AlF$_3$, 0 to 5% YF$_3$, 22 to 55% BaF$_2$+SrF$_2$+CaF$_2$+MgF$_2$ with 2 to 12% BaF, 4 to 18% SrF$_2$, 15 to 28% CaF$_2$ and 0 to 5% MgF$_2$, 0 to 25% NaF+λ LiF+KF and 0.01 to 3% of at least one laser oscillation component selected from the group consisting of ½ Er$_2$O$_3$, ½ Eu$_2$O$_3$ and ½Nd$_2$O$_3$, said percentages being cationic %, said glass not containing any glass forming component which would adversely affect laser oscillation efficiency thereof.

8. The fluorophosphate-base laser glass as claimed in claim 7, further comprising 0.1 to 4 cationic % MoO$_3$+TiO$_2$+½Nb$_2$O$_5$ as components for preventing the occurrence of solarization.

9. The fluorophosphate-base laser glass as claimed in claim 7, wherein said laser oscillation component is ½Nd$_2$O$_3$.

* * * * *